US008155603B2

(12) United States Patent
Gunasekara et al.

(10) Patent No.: US 8,155,603 B2
(45) Date of Patent: Apr. 10, 2012

(54) SYSTEM AND METHOD OF UNLICENSED BI-DIRECTIONAL COMMUNICATIONS OVER AN ULTRA-HIGH FREQUENCY (UHF) BAND RESERVED FOR LICENSED COMMUNICATIONS

(75) Inventors: Don Gunasekara, Reston, VA (US); Fazal Mahmood, Springfield, VA (US); Sunil Prasad, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 560 days.

(21) Appl. No.: 12/416,983

(22) Filed: Apr. 2, 2009

(65) Prior Publication Data
US 2010/0255801 A1 Oct. 7, 2010

(51) Int. Cl.
*H04B 1/02* (2006.01)
(52) U.S. Cl. .......................................... 455/91; 455/103
(58) Field of Classification Search .................... 455/91, 455/101, 102, 103, 108, 110, 115.1, 126
See application file for complete search history.

(56) References Cited

U.S. PATENT DOCUMENTS

| 4,422,096 A * | 12/1983 | Henderson ..................... 348/731 |
| 2008/0020702 A1* | 1/2008 | Jendbro et al. ............... 455/3.01 |
| 2008/0134280 A1* | 6/2008 | Kim ............................... 725/151 |
| 2009/0144791 A1* | 6/2009 | Huffman et al. .............. 725/114 |
| 2010/0277363 A1* | 11/2010 | Kainulainen et al. ......... 342/174 |

* cited by examiner

Primary Examiner — Henry Choe
(74) Attorney, Agent, or Firm — Crowell & Moring LLP (57) ABSTRACT

Systems and methods of unlicensed bi-directional communications over Ultra-High Frequency (UHF) band reserved for licensed communications are provided. A base transceiver station scans the UHF band to identify unused frequency bands. When an unused frequency band is detected, the base transceiver station transmits a tone indicating that the unused frequency band can be used for communicating with the base transceiver station. When the base transceiver station determines that the unused frequency band is being used, then the base transceiver station scans the UHF band to identify another unused frequency band for communications.

18 Claims, 5 Drawing Sheets

SYSTEM AND METHOD OF UNLICENSED BI-DIRECTIONAL COMMUNICATIONS OVER AN ULTRA-HIGH FREQUENCY (UHF) BAND RESERVED FOR LICENSED COMMUNICATIONS

BACKGROUND OF THE INVENTION

Governmental bodies control access to radio frequency spectrum. In some cases radio frequency spectrum is reserved for unlicensed communications. For example, in the United States the government has reserved the 902-928 MHz and 2400-2483.5 MHz frequency bands (commonly referred to as the Industrial, Scientific and Medical (ISM) frequency bands) for unlicensed communications. Thus, Bluetooth wireless communication devices can operate on the ISM frequency bands without requiring a license for such communications.

Other radio frequency spectrum is licensed by governments, for example, by auctions to particular operators. While sets of frequency bands may be reserved for certain types of licensed communications, not all of the frequencies within the band may be used within all geographic areas. For example, certain frequencies within the ultra-high frequency (UHF) band are reserved for analog television broadcasts, but not all geographic locations include licenses for all of the reserved frequencies. Thus, while the 470-512 MHz frequencies are reserved for analog television channels 14-20, any particular geographic area will typically include only one of two television channels using these reserved frequencies.

SUMMARY OF THE INVENTION

Recently there has been much discussion of allowing unlicensed communications over frequencies reserved for licensed communications using so-called "white space" within the UHF band typically used by analog television broadcasts. The white space corresponds to frequencies that are reserved for licensed communications but may not actually be licensed in a particular geographic area, or may be licensed but not used by the licensee. Television broadcasters have objected to the use of white space for unlicensed communications due to concerns about interference to their broadcasts. Thus, it is desirable to provide systems and methods that allow unlicensed communications over frequencies reserved for licensed communications.

Exemplary embodiments of the present invention provide systems and methods of communicating over frequency bands that are reserved for licensed communications. In particular, the present invention employs a "listen-before-talk" technique to avoid interfering with licensed communications. The present invention also scans the frequency bands that are reserved for licensed communications in order to identify unused frequency bands. Accordingly, the present invention allows for unlicensed communications over frequency bands reserved for licensed communications without causing interference to any of the licensed communications. Furthermore, when it is not possible to perform unlicensed communications over the frequency bands reserved for licensed communications, the present invention provides that a communication device and base transceiver station can communicate using licensed communications over licensed frequency bands.

According to one aspect of the present invention, a method involves scanning an ultra-high frequency (UHF) band and identifying whether there are frequency bands within the UHF frequency band suitable for transmitting information. When there are frequency bands within the UHF band suitable for transmitting the information, an unlicensed communication channel is established over one of the frequency bands suitable for transmitting the information. When there are not frequency bands within the UHF band that are suitable for transmitting the information, a licensed communication channel is established over a second frequency band that is different than the UHF band.

In accordance with another aspect of the present invention a method involves scanning an ultra-high frequency (UHF) band and determining whether one or more frequency bands within the UHF band are suitable for transmitting the information. When the one or more frequency bands within the UHF band are suitable for transmitting the information, one of the frequency bands within the UHF band is selected and a tone is transmitted over the selected frequency band. When the one or more frequency bands within the UHF band are not suitable for transmitting the information, a communication channel is established over a second frequency band that is not coextensive with the UHF band.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1A:
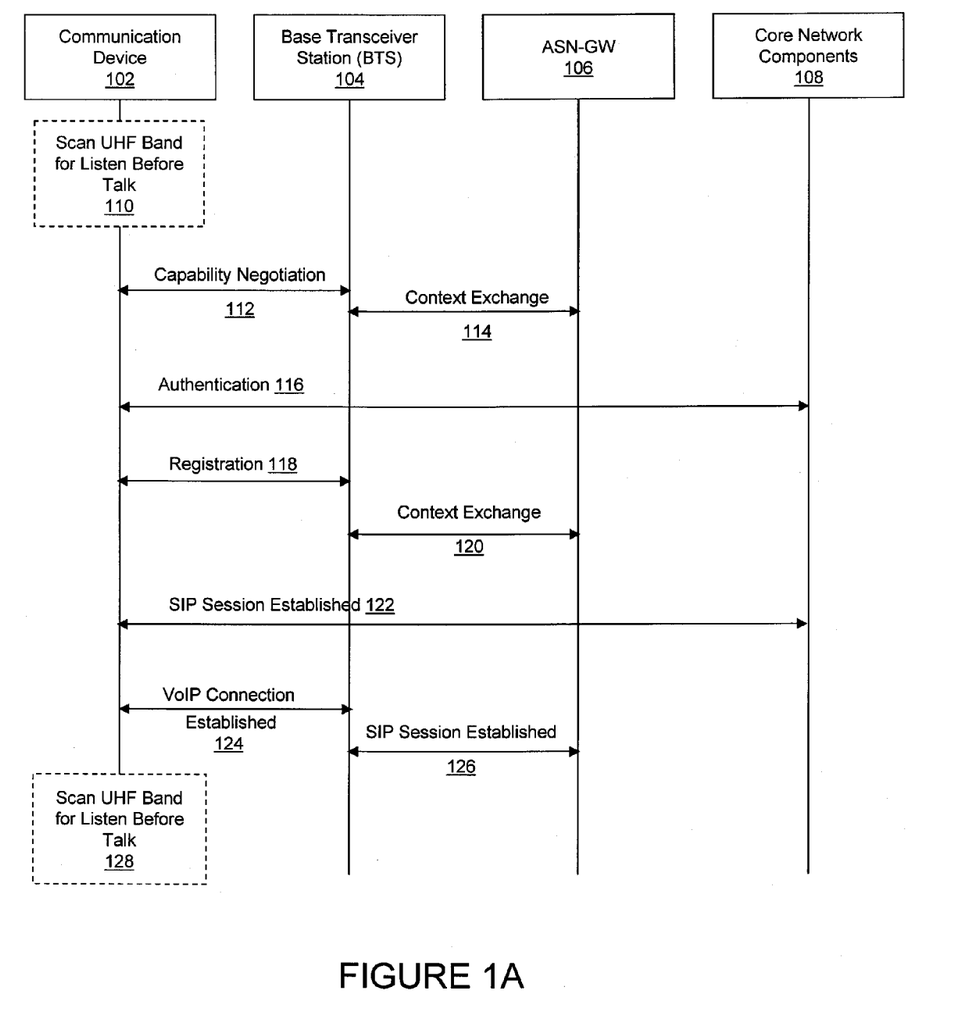
FIG. 1A is an exemplary call flow diagram in accordance with the present invention.

FIG. 1A is an exemplary call flow diagram in accordance with the present invention. The call flow diagram involves a communication device 102 that communicates with base transceiver station (BTS) 104 using radio frequencies. BTS 104 is coupled via an access serving node gateway (ASN-GW) 106 to core network components 108, which support wireless communications. As will be described in more detail below, communication device 102 and BTS 104 can communicate using frequencies licensed for such communications (e.g., frequencies licensed to a cellular network operator) or can perform unlicensed communications using licensed frequencies reserved for other types of communications (e.g., frequencies within the UHF band that are subject to governmental licensing requirements). The call flow of FIG. 1A assumes that communication device 102 and BTS 104 have already identified an unused frequency band within the UHF band that is reserved for licensed communications.

Initially, communication device 102 scans the UHF band to determine whether there are any other communications occurring over the selected unused frequency band (step 110). This technique is referred to as "listen-before-talk", and allows communications over frequency bands within the UHF frequency band that are reserved for licensed communications. In particular, although not all of the frequency bands within the UHF band are licensed in a particular geographic area, apart from certain portions of the UHF band (e.g., the ISM band), the remaining portions are reserved only for licensed communications. Accordingly, by employing a listen-before-talk communication technique, the present invention allows for unlicensed communications over frequency bands that are reserved only for licensed communications.

Assuming that there are no other communications occurring over particular UHF channels, communication device 102 selects one or more frequencies from the UHF band and performs a capability negotiation with BTS 104 (step 112). Base station 104 then performs a context exchange with ASN-GW 106 in order to inform the gateway of the communication device's capabilities (step 114). Because communication device 102 has not yet been authenticated and registered, the context exchange includes a limited amount of information about communication device 102.

Communication device 102 then performs an authentication with the core network components 108 by exchanging messages via base station 104 and ASN-GW 106 (step 116). After a successful authentication, communication device 102 then exchanges registration messages with BTS 104 (step 118). BTS 104 then performs a context exchange with ASN-GW 106 in order to inform the gateway of the communication device's capabilities (step 120). Because communication device 102 has been authenticated and registered, the context exchange of step 120 includes the remaining information about the capabilities of communication device 102 beyond that already exchanged in step 114.

After successfully registering with base station 104, communication device 102 can then establish a communication session with core network components 108 (step 122). In the exemplary call flow of FIG. 1A this communication session is a Session Initiation Protocol (SIP) communication session. Communication device 102 then can establish a voice over IP (VoIP) connection with BTS 104 (step 124), which in turn establishes a SIP session with ASN-GW 106 (step 126). Whenever communication device 102 attempts to communicate with BTS 104, the communication device performs a "listen-before-talk" procedure to ensure that the radio frequencies are not currently being used for licensed communications (step 128).

Figure 1B:
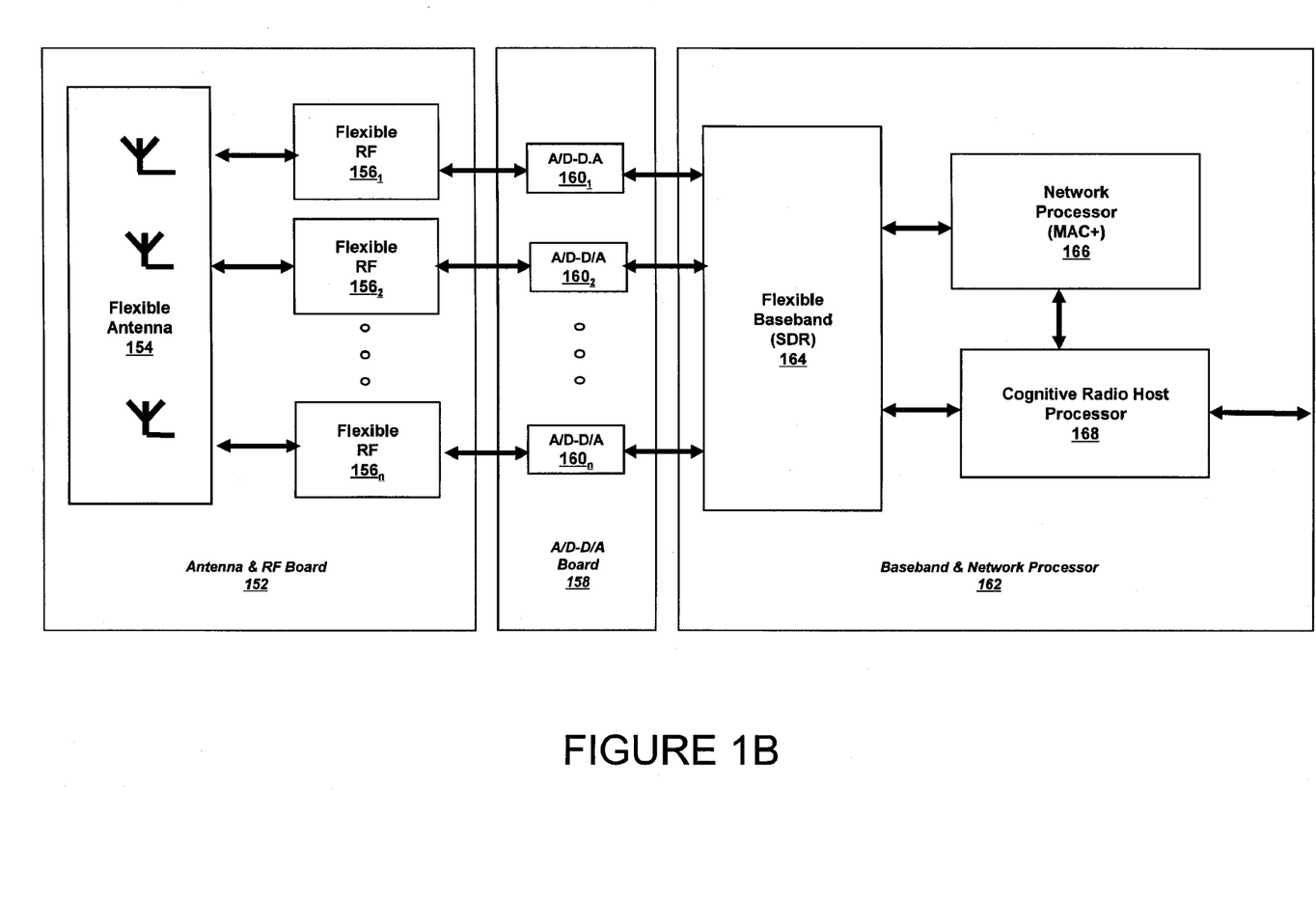
FIG. 1B is a block diagram of an exemplary communications arrangement in accordance with the present invention.

FIG. 1B is a block diagram of an exemplary communications arrangement in accordance with the present invention. This arrangement can be part of communication device 102 and/or BTS 104. The arrangement includes an antenna and radio frequency (RF) board 152 coupled to an analog-to-digital and digital-to-analog (A/D-D/A) board 158, which in turn is coupled to a baseband and network processor board 162. Antenna and RF board 152 can be a micro electro-mechanical system (MEM)-based tri-band agile RF front end.

The arrangement provides for multiple input-multiple output (MIMO) communications. Specifically, antenna and RF board 152 includes a plurality of antennas respectively coupled to a plurality of RF transceivers $156_1$-$156_n$, which in turn are respectively coupled to a plurality of analog-to-digital and digital-to-analog (A/D-D/A) converters $160_1$-$160_n$. Converters $160_1$-$160_n$ are coupled to a software defined radio (SDR) 164, which is capable of operating using a variety of different types of baseband signals. Software defined radio 164 is coupled to network processor 166 and a cognitive radio host processor 168.

Software defined radio 164 can include a number of different functions. One function is a channelization function that can be, for example, a configurable multi-stage filter to select a sub-band and/or decimate the input signal according to the particular communication standard employed for the communications. Another function is a fast Fourier transform (FFT)/modified Walsh transform (MWT) to handle the FFT operations used in OFDM and the MWT operations used in 802.11b. The radio can also perform interleaving using a block-based memory and multiplexer-based address handler, the interleaving can be of any type of interleaving used for any type of communication standard. The radio can further handle data and channel encoding/decoding, including Viterbi (for 802.11a) turbo (for WCDMA). While both the data and channel encoder have a similar connection pattern, only the data encoder requires feedback. A common block can be employed to handle the two functions in a single clock cycle. The radio also performs common interface detection and estimation.

Cognitive radio processor 168 receives information from software defined radio 164 regarding the type of radio link being employed and informs network processor 166 of the type of radio link being employed and how to process information received over the link. Network processor 166 handles medium access control (MAC) processing and operates at the waveform level, whereas cognitive radio host processor 168 operates on the radio frequency spectrum level and controls the particular radio frequencies on which communications occur. Software defined radio 164, network processor 166 and cognitive radio host processor 168 can be, for example, comprised of a microprocessor, field programmable gate array (FPGA) and/or application specific integrated processor (ASIC).

Network processor 166 performs, among other things, power control and channel assignments in order to maximize uplink and downlink throughput. The power control can be an open loop or closed loop power control technique. An open loop power control technique involves the communication device estimating the pathloss in the downlink and then adjusting the transmit power to a level that can reach the BTS. A closed loop power control technique involves the BTS measuring the received power from a communication device, comparing the received power to a reference value and then informing the communication device of an adjustment to the transmit power level.

Power control can be initiated by either the BTS or the communication device by broadcasting a particular tone. All parties (i.e., BTSs and communication devices) that intend to transmit on a particular channel should confirm their participation by participating in the power control process. After confirmation, the participating parties set their transmit powers to an initial power values of $P_i^c(0)$ and $P^c(0)$, respectively, where $P_i^c(0)$ is a relatively high maximum transmit power level and $P^c(0)$ is a relatively low minimum transmit power level. Communication devices and BTS generally begin transmissions at the low minimum transmit power level $P^c(0)$ and increase the transmit power only when needed. In order to control interference the transmit power is not adjusted beyond the maximum transmit power level $P_i^c(0)$.

Downlink and uplink throughput control can be performed using a distributed and/or centralized control scheme to maximize the throughput while protecting primary users of the radio frequencies.

Figure 2:
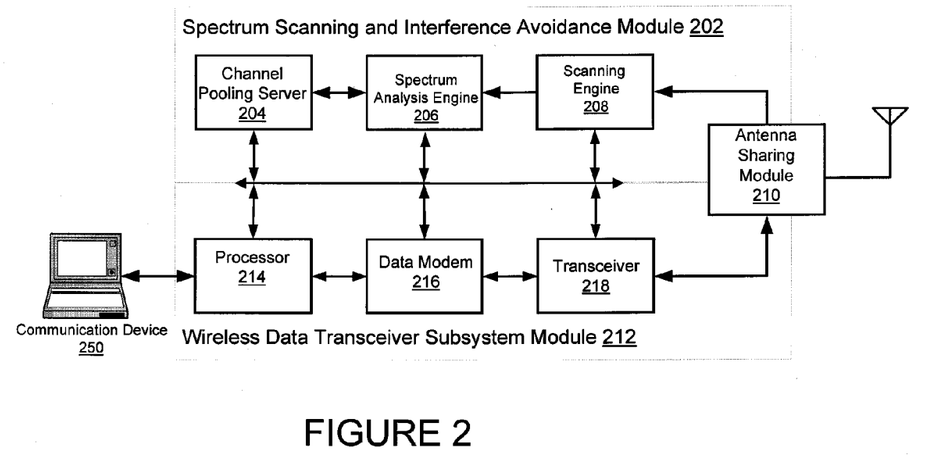
FIG. 2 is another block diagram of an exemplary communications arrangement in accordance with the present invention.

FIG. 2 is another block diagram of an exemplary communications arrangement in accordance with the present invention. This communications arrangement is a more detailed illustration of the arrangement of FIG. 1B. The communications arrangement can an integrated component of, or coupled to, communication device 250. The communication arrangement includes a spectrum scanning and interference module 202 and wireless data transceiver subsystem module 212, the components of which are coupled to a common bus. An antenna sharing module 210 bridges the two modules and provides information about the wireless environment to scanning engine 208.

Module 202 identifies unoccupied frequencies for communication. Specifically, scanning engine 208 selects the relevant frequencies (e.g., the UHF) to provide to spectrum analysis engine 206 for identifying unoccupied frequency bands within the UHF band. The identified unoccupied frequencies are provided to channel pooling server 204. These unoccupied frequencies can then be used for communications between a communication device and BTS.

Module 212 is used for communication in a conventional manner. Accordingly, transceiver 218 performs frequency upconversion/downconversion, data modem 216 performs modulation/demodulation, and processor 214 performs the protocol specific processing necessary for providing data to/from communication device 250. Data modem 216 can perform any type of modulation/demodulation, including, for example, OFDM and DSSS/QPSK. Transceiver 218 is capable of multi-band operation, including in UHF and other licensed wireless frequency bands.

The arrangement of FIG. 2 can provide operating throughput of, for example, 60 Mb/s with the ability of an aggregate throughput of approximately 80 Mbps. Although the communications arrangement of FIG. 1B is illustrated as being coupled to, or a component of, a communication device, this communication arrangement can also be used for BTS 104.

Figure 3:
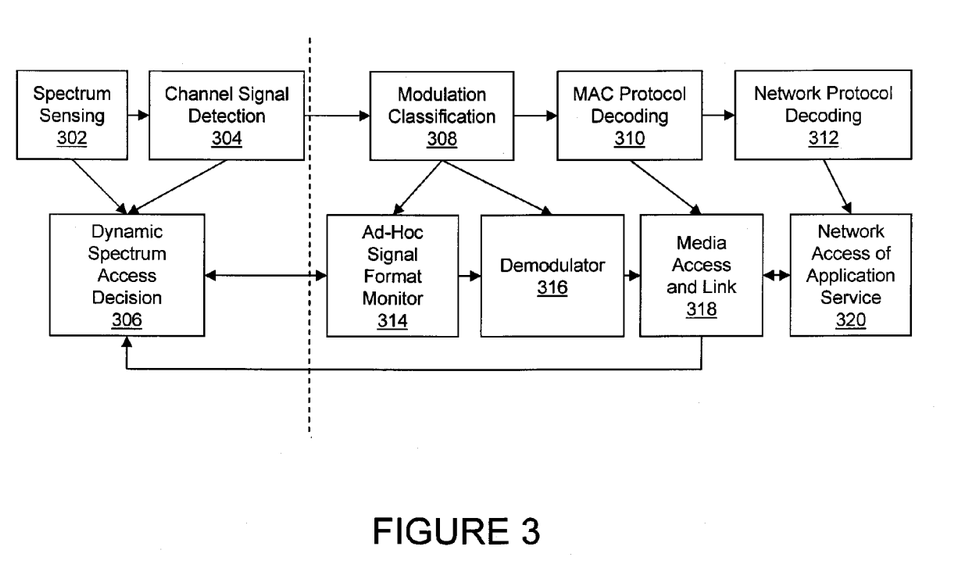
FIG. 3 is a block diagram of modules used for exemplary communications arrangements in accordance with the present invention.

FIG. 3 is a block diagram of modules used for exemplary communications arrangements in accordance with the present invention. In the diagram of FIG. 3 the modules on the left of the vertical dashed line operate on the frequency spectrum level and the modules on the right operate on the waveform level. Turing first to the spectrum level modules, module 302 receives information about the wireless environment and provides the information to channel signal detection module 304 and dynamic spectrum access decision module 306. Thus, module 302 corresponds to the scanning engine 208 of FIG. 2, and modules 304 and 306 correspond to spectrum analysis engine 206.

Turning now to waveform level modules, modules 308-314, 318 and 320 are components of processor 214 of FIG. 2, and demodulator 316 is a component of data modem 216. Modulation classification module 308 determines the type of modulation used for wireless signals and passes the information to MAC protocol decoding module 310, ad-hoc signal format monitor 314 and demodulator 316. MAC protocol decoding module 310 determines the type of coding employed on the MAC level and provides the information to network protocol decoding module 312 and media access and link module 318. Network protocol decoding module 312 determines the type of coding performed on the network level and passes the result to network access of application service module 320, which processes the received application layer information, such as VoIP, streaming video, etc.

Ad-hoc signal format monitor 314 receives information from modulation classification module 308 and dynamic spectrum access decision 306 in order to determine a format of signals and provides the format type to demodulator 316. It will be recognized that when radio frequency conditions worsen, absent any other changes the packet error rate (PER) will also worsen, leading to a decreased data rate. This can be addressed by changing the type of modulation and coding scheme based on the radio frequency conditions to maintain a data rate. For example, when a signal-to-noise ratio (SNR) is good, a 64 QAM can be used to provide a higher data rate, whereas in poor SNR conditions a 16 QAM is used, which results in a lower data rate but decreases the packet error rate.

Demodulator 316 uses the information from modulation classification module 308 to demodulate the signals received from ad-hoc signal format monitor 314, and passes the result to media access and link module 318. Media access and link module 318 analyzes the medium access control and link layer protocols used by the system and provides the information to dynamic spectrum access decision module 306 and to network access of application service module 320.

Figure 4A:
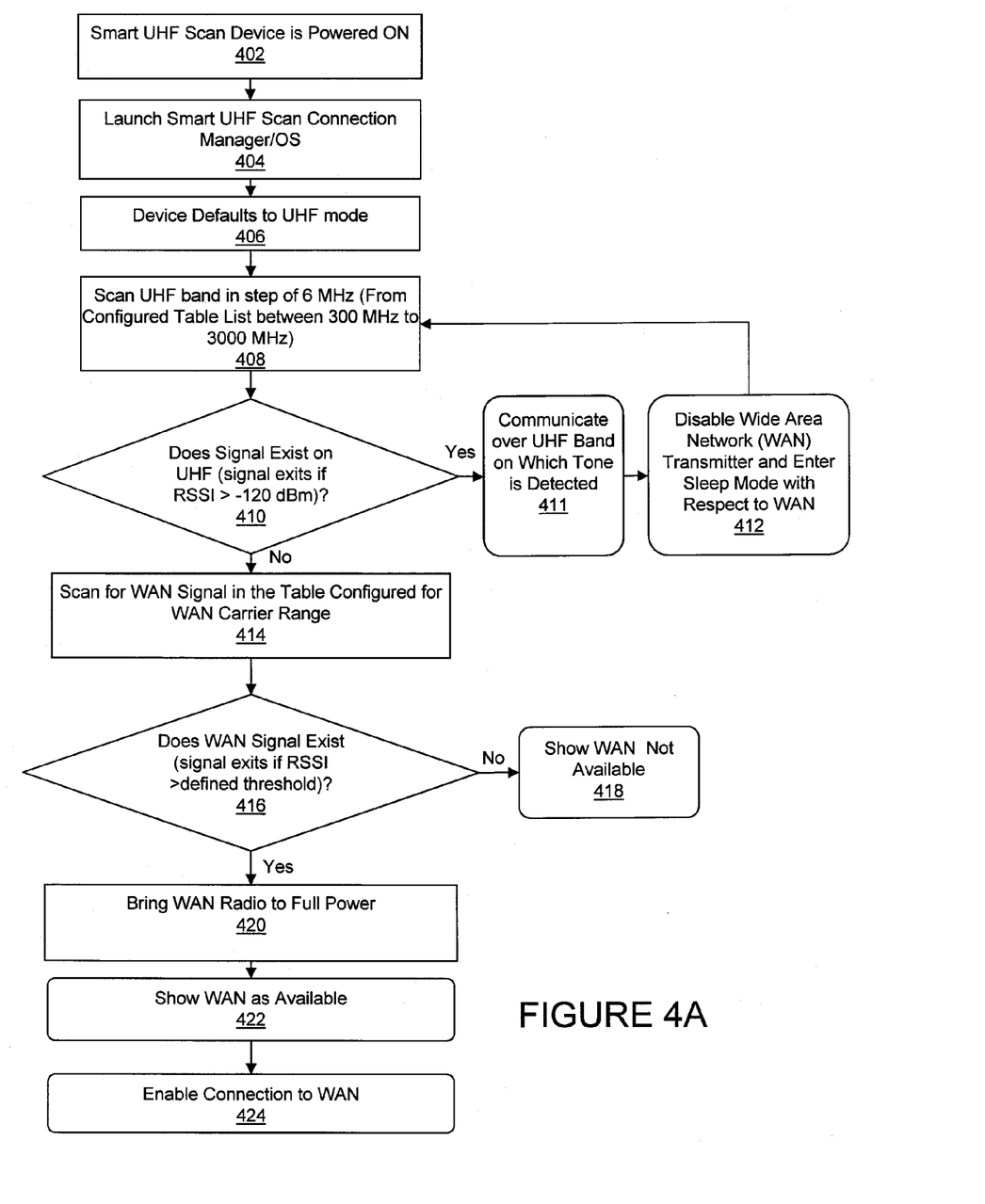
FIG. 4A is a flow chart of an exemplary method for communication device in accordance with the present invention.

FIG. 4A is a flow chart of an exemplary method for communication device in accordance with the present invention. When it is desired to transmit information smart UHF scanning device is powered on (step 402) and the smart UHF scan connection manager/operating system (OS) is launched (step 404). The device initially defaults to the UHF communication mode in which communications are first attempted over the frequencies reserved for licensed communications (step 406). The UHF band is scanned in 6 MHz steps from a configuration table from 300 MHz to 3,000 MHz (step 408) and it is determined whether a UHF signal currently exists within the particular UHF frequency band (step 410). This scanning is performed in order to identify whether any BTSs are communicating over UHF or whether the frequency band is occupied by licensed communications. In particular, when a BTS is communicating over UHF, the BTS will broadcast a tone on a particular frequency that should be used for communicating with the BTS. A licensed communication signal is determined to exist when the received signal strength indication (RSSI) is greater than −120 dBm.

When the communication device determines that a licensed communication signal does not exist and detects a tone in a particular frequency band of the UHF band ("Yes" path out of decision step 410), the communication device will use the frequency on which the tone is detected to communicate with BTS (step 411). The communications between the communication device and BTS can be performed in accordance with the call flow described above in connection with FIG. 1A. The communication device then disables the communication circuitry used for communicating with the wide area network (WAN) and enters a sleep mode with respect to the WAN (step 412). The WAN can be any type of wide area network (e.g., 2G, 2.5G, 3G or 4G) operating according to any type of protocol (e.g., WiMAX, LTE, EV-DO, etc.). The communication device will periodically scan the UHF (step 408) in order to identify tones transmitted by other BTSs.

When there are vacant frequencies in the UHF frequency band ("No" path out of decision step 410), then frequencies in a table configured for WAN signals are scanned (step 414) and it is determined whether a WAN signal exists within the scanned carrier range (step 416). This determination is based on whether the RSSI is greater than a predefined threshold value. The frequencies that are included in the table can be associated with one or more wireless network operators and/or wireless communication technology. When no WAN signals exist ("No" path out of decision step 416), then the communication device outputs an indication that the WAN is unavailable (step 418). If, however, a WAN signal exists ("Yes" path out of decision step 416), then the WAN radio is transitioned into a full power mode (step 420), an indication that the WAN is available is output (step 422) and the WAN connection is enabled (step 424).

Figure 4B:
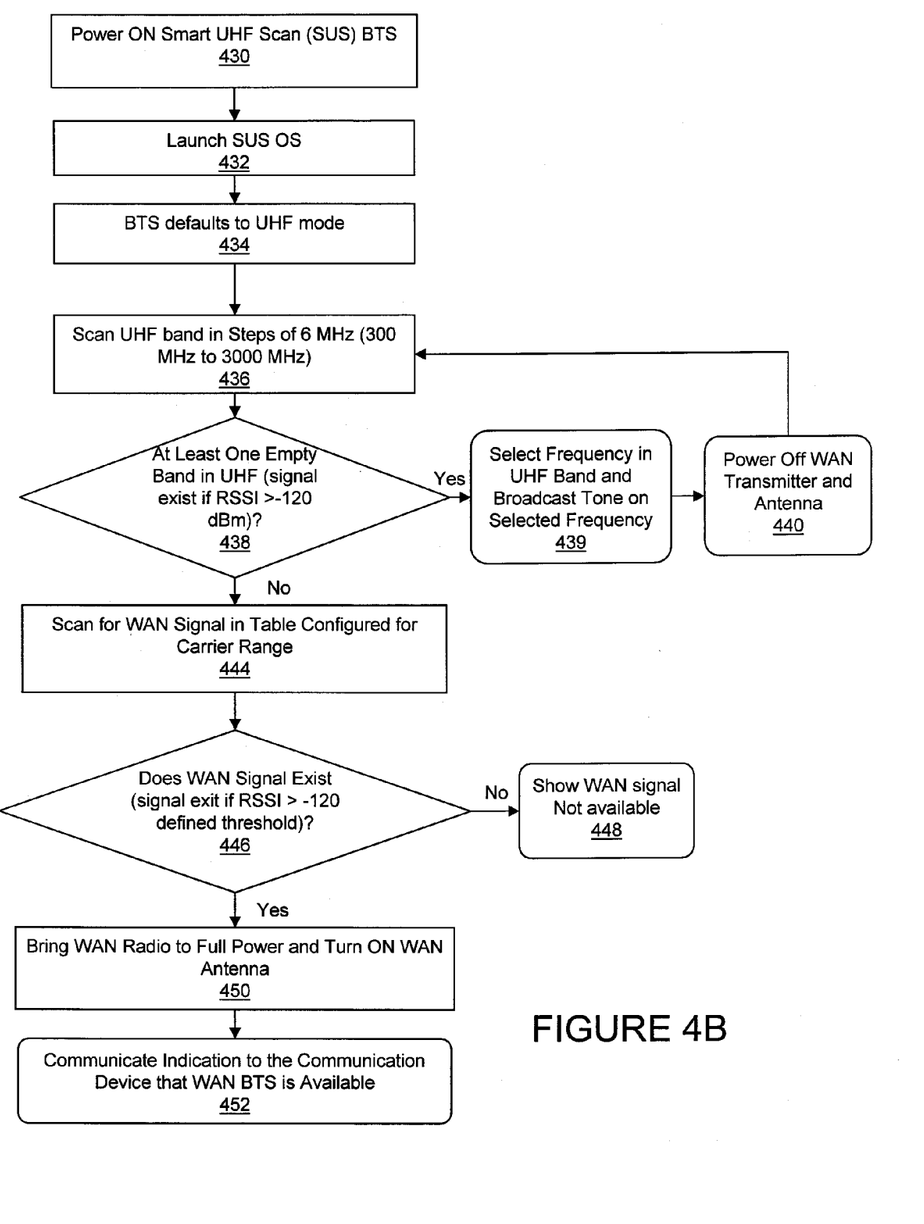
FIG. 4B is a flow chart of an exemplary method for a base transceiver station (BTS) in accordance with the present invention.

FIG. 4B is a flow chart of an exemplary method for a base transceiver station (BTS) in accordance with the present invention. When the BTS is powered on (step 430) the BTS launches a smart UHF scan operating system (OS) (step 432). The BTS initially defaults to the UHF communication mode in which communications are first attempted over the frequencies reserved for licensed communications (step 434), and the BTS scans the UHF band in 6 MHz steps from a configuration table from 300 MHz to 3,000 MHz (step 436). Based on the results of the scan, the BTS determines whether there is at least one 6 MHz band in the UHF that is empty (step 438). A signal is determined to exist within a 6 MHz band when the received signal strength indication (RSSI) is greater than −120 dBm. When there is at least one 6 MHz band that is vacant in the UHF band ("Yes" path out of decision step 438), then the BTS selects one of the vacant 6 MHz bands and transmits a tone over a 1.25 MHz portion of the selected frequency band (step 439). The BTS also turns off the WAN transmitter and the antenna (step 440). The BTS will then periodically scan the UHF band to identify additional empty frequency bands within the UHF band (step 436). Although not illustrated in FIG. 4B, the BTS can then communicate with one or more communication devices over the 1.25 MHz portion of the selected frequency band. During this time the BTS will determine whether the selected frequency band continues to be empty, and when the selected frequency band is occupied, the BTS will cease to use the selected frequency band and scan in order to select a new frequency band.

When there are no vacant frequencies within the UHF frequency band ("No" path out of decision step 438), then frequencies in a table configured for WAN signals are scanned (step 444) and it is determined whether a WAN signal exists within the scanned carrier range (step 446). This determination is based on whether the RSSI is greater than a predefined threshold value. When no WAN signals exist ("No" path out of decision step 446), then the BTS outputs an indication that the WAN is unavailable (step 448). If, however, a WAN signal exists ("Yes" path out of decision step 446), then the WAN radio of the BTS is transitioned into a full power mode (step 450), and a status information indication that the BTS is available is communicated to the communication device (step 452). This allows the BTS to operate as a repeater using frequencies for which the BTS is licensed to operate on in the particular geographic area.

Although FIGS. 4A and 4B illustrate scanning the UHF band to identify unused frequency bands, the present invention can also be employed using a database identifying unused frequency bands. In this case the communication device and BTS can determine their current geographical location using any technique (e.g., GPS, based on a received BTS ID (BSID), etc.) and report the location to a network element. The network element can determine, using a network database and the reported location, frequency bands within the UHF band that are unused at that particular geographic location.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising the acts of:
scanning an ultra-high frequency (UHF) band;
identifying whether there are frequency bands within the UHF frequency band suitable for transmitting information;
wherein when there are frequency bands within the UHF band suitable for transmitting the information, an unlicensed communication channel is established over one of the frequency bands suitable for transmitting the information, and
wherein when there are not frequency bands within the UHF band that are suitable for transmitting the information, a licensed communication channel is established over a second frequency band that is different than the UHF band.

2. The method of claim 1, wherein the assessing act comprises:
scanning a plurality of portions of the UHF band; and
determining whether a signal exists on each of the plurality of portions of the UHF frequency band.

3. The method of claim 2, wherein a signal exists when a received signal strength indicator is greater than −120 dBm.

4. The method of claim 2, wherein the plurality of portions of the UHF frequency band are scanned in 6 MHz steps.

5. The method of claim 1, further comprising:
sending a signal to another communication station over one of the frequency bands suitable for transmitting the information, wherein the signal indicates that the frequency band is suitable for transmitting information.

6. The method of claim 1, further comprising:
establishing a session initiation protocol (SIP) session with another network entity over the unlicensed communication channel.

7. The method of claim 1, further comprising:
periodically assessing the UHF band for suitability for transmitting information.

8. The method of claim 1, wherein the unlicensed communication channel has a bandwidth of 1.25 MHz.

9. The method of claim 1, wherein the second frequency band is a band licensed to a two-way wireless communication network operator.

10. The method of claim 9, wherein the frequency bands within the UHF frequency band suitable for transmitting information are selected from frequency bands reserved for licensed television broadcasts.

11. A method, comprising the acts of:
scanning an ultra-high frequency (UHF) band;
determining whether one or more frequency bands within the UHF band are suitable for transmitting the information;
wherein when the one or more frequency bands within the UHF band are suitable for transmitting the information, selecting one of the frequency bands within the UHF band and transmitting a tone of the selected frequency band, and
wherein when the one or more frequency bands within the UHF band are not suitable for transmitting the information, a communication channel is established over a second frequency band that is not coextensive with the UHF band.

12. The method of claim 11, wherein the determination of whether one or more frequency bands within the UHF band are suitable for transmitting the information is based on whether a received signal strength indicator is greater than −120 dBm.

13. The method of claim 12, wherein the plurality of portions of the UHF frequency band are scanned in 6 MHz steps.

14. The method of claim 11, further comprising:
transmitting the information over the communication channel established over the portion of the UHF band;
performing a power control technique; and
adjust a power of subsequent transmissions based on results of the power control technique.

15. The method of claim 11, further comprising:
establishing the communication channel of over the selected frequency bands within the UHF band by establishing a session initiation protocol (SIP) session with a communication device.

16. The method of claim 15, wherein the established communication channel has a bandwidth of 1.25 MHz.

17. The method of claim 11, further comprising:
periodically determining whether the selected frequency band is unoccupied,
wherein when the selected frequency band is occupied, the UHF band is rescanned for suitability for transmitting information.

18. The method of claim 11, wherein the second frequency band is a band licensed to a two-way wireless communication network operator.

* * * * *